(12) United States Patent
Pavier

(10) Patent No.: US 12,313,387 B2
(45) Date of Patent: May 27, 2025

(54) DEVICE AND METHOD FOR SIMULATING A DYNAMIC MUNITION-RELATED ENVIRONMENT FOR A PROJECTILE, AND SIMULATION DEVICE-PROJECTILE ASSEMBLY

(71) Applicant: NEXTER MUNITIONS, Versailles (FR)

(72) Inventor: Julien Pavier, Bourges (FR)

(73) Assignee: NEXTER MUNITIONS, Versailles (FR)

( * ) Notice: Subject to any disclaimer, the term of this patent is extended or adjusted under 35 U.S.C. 154(b) by 310 days.

(21) Appl. No.: 18/153,707

(22) Filed: Jan. 12, 2023

(65) Prior Publication Data
US 2023/0251071 A1    Aug. 10, 2023

(30) Foreign Application Priority Data
Feb. 10, 2022   (FR) ...................................... 2201028

(51) Int. Cl.
*F42B 35/00*   (2006.01)
*G01M 7/08*   (2006.01)

(52) U.S. Cl.
CPC ............... *F42B 35/00* (2013.01); *G01M 7/08* (2013.01)

(58) Field of Classification Search
CPC ..................................................... G01M 7/08
See application file for complete search history.

(56) References Cited

U.S. PATENT DOCUMENTS

| | | | | | |
|---|---|---|---|---|---|
| 3,218,849 | A | * | 11/1965 | Marvinney | F42B 35/00 73/167 |
| 4,696,182 | A | * | 9/1987 | Meir | G01N 3/307 73/12.05 |
| 2009/0126455 | A1 | * | 5/2009 | Read | G01N 3/30 73/12.11 |
| 2015/0241326 | A1 | | 8/2015 | Graham et al. | |

FOREIGN PATENT DOCUMENTS

| | | | | |
|---|---|---|---|---|
| CN | 214538448 | U | * 10/2021 | |
| FR | 2 897 686 | A1 | 8/2007 | |
| WO | WO-2018224831 | A1 | * 12/2018 | G01M 7/08 |

OTHER PUBLICATIONS

Sep. 27, 2022 Search Report and Written Opinion issued in French Patent Application No. 2201028.

* cited by examiner

*Primary Examiner* — Natalie Huls
(74) *Attorney, Agent, or Firm* — Oliff PLC

(57) ABSTRACT

A device for simulating a dynamic munition-related environment for a projectile, and a simulation device-projectile assembly including: a suspension device configured for suspending the projectile along the longitudinal direction of the projectile in such a way that the projectile is mounted freely along the longitudinal axis of the projectile; a propulsion device configured for being positioned facing the rear end of the projectile at a predefined distance from the projectile; and an impactor configured for being propelled, by the propulsion device, at a predetermined velocity toward the rear end of the projectile so as to strike the projectile so as to reproduce a shock response spectrum specific to an exit from a muzzle.

13 Claims, 2 Drawing Sheets

Figure 1:
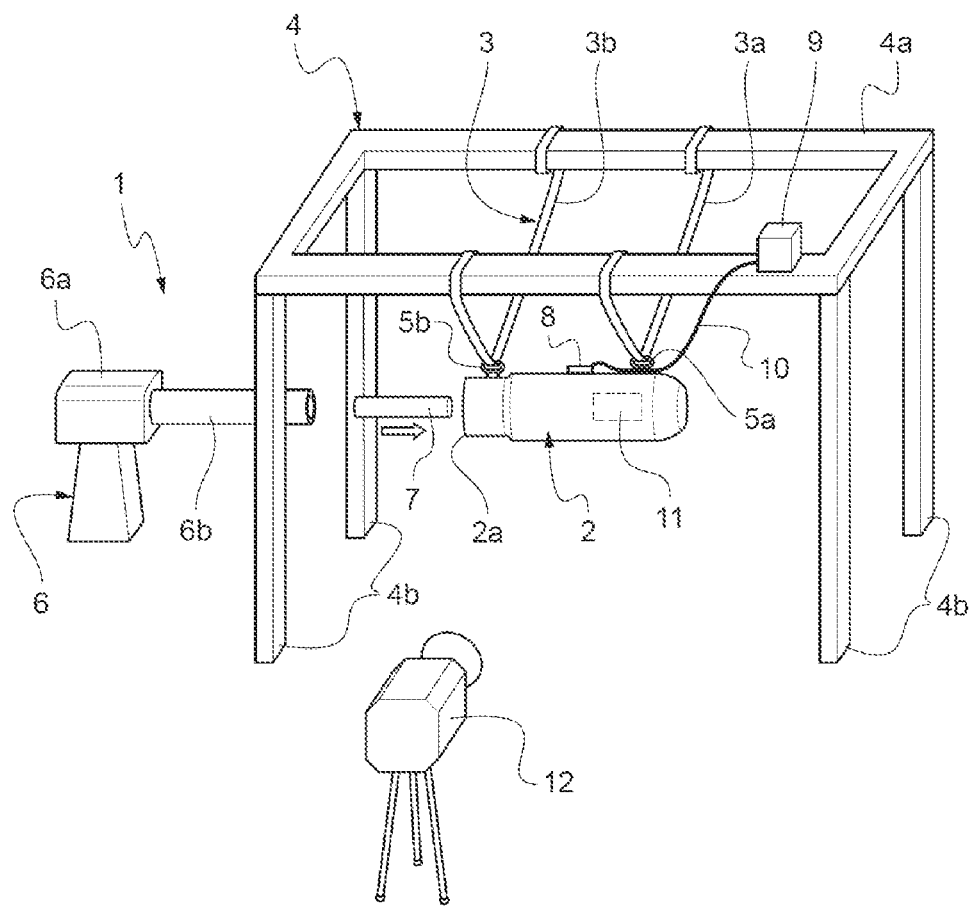

DEVICE AND METHOD FOR SIMULATING A DYNAMIC MUNITION-RELATED ENVIRONMENT FOR A PROJECTILE, AND SIMULATION DEVICE-PROJECTILE ASSEMBLY

The present invention relates to the field of ammunition, and relates in particular to a device and a method for simulating a dynamic munition-related environment for a projectile, and to an associated simulation device-projectile assembly.

The shock environments which can be encountered in a military environment are simulated (i.e. reproduced) by shock simulators for shocks of ballistic or pyrotechnic origin, such as the simulators disclosed in the French patent application FR2897686A1, which aims to check the resistance of equipment (intended to be integrated into military vehicles) experiencing shocks similar to the shocks which can be encountered in a military environment. Such existing shock simulators can be used for recreating the stress conditions on portions of equipment while always having third-party equipment as an interface (namely, the impact plate in the French patent application FR2897686A1). However, the existing shock simulators cannot be used for reproducing the particular environments of the muzzle blasts encountered by projectiles. Indeed, muzzle blasts are very particular. A muzzle blast is the mechanical stress generated by the exit of a projectile at the end of a weapon barrel. The projectile changes at such moment from an acceleration, where same is guided through a weapon barrel, to a stopping of the thrust and an entry into a phase of flight. Pyroshock environments studied in the space and missile-related fields are often considered to be close to muzzle blast environments. There are different techniques for reproducing the muzzle blast environments, which are based on:

the definition of a source of excitation (e.g., by mechanical impact or detonation of a cord), and the design of an "excited" structure designed specifically for transmitting the high frequency vibratory response modes thereof to the electronic structures to be tested and thus reproducing a dynamic environment specified in general in the form of a shock response spectrum (SRS). An example of an existing technique is disclosed in the book "Harris' shock and vibration handbook", fifth edition, by Cyril M. Harris and Allan G. Piersol, in FIG. 26.15 in Chapter 26, Part II, said existing technique being based on the excitation of a test unit, which is suspended, by an impact-excited mechanical resonator. However, the means developed in the spatial and missile-related fields are specific to such fields and cannot be used specifically for reproducing muzzle blast spectra. In general, the means can be used for testing the resistance of a block or of a coated electronic structure, but not for working e.g. on a concept of protection of blocks by damping or decoupling the modes of a structure representative of projectiles. The presence of a mechanical resonator on the projectile would indeed modify the structural reality of the projectile.

The present invention aims to solve the drawbacks of the prior art, by proposing a device and a method for simulating a dynamic munition-related environment for a projectile, which can be used for reproducing a shock environment specific to an exit of a projectile from a muzzle, by directly striking the rear end of the projectile which is suspended.

Compared to the prior art, the present invention provides the greatest possible fidelity, since same allows the object being studied (i.e. the projectile) to be stressed as a whole and without any intermediate artifice and for a precise and difficult to reproduce type of stress which is the muzzle blast related to the projectile exit.

The object of the present invention is thus a device for simulating a dynamic munition-related environment for a projectile, characterized by the fact that same comprises: a suspension device configured for suspending the projectile along the longitudinal direction thereof so that the projectile in the suspended position thereof is freely mounted along the longitudinal axis thereof; a propulsion device configured for being arranged facing the rear end of the projectile in the suspended position thereof at a predetermined distance therefrom; and an impactor configured for being propelled by the propulsion device, at a predefined velocity toward the rear end of the projectile in the suspended position thereof so as to strike the rear end of the projectile in order to reproduce a shock response spectrum which is specific to an exit of the projectile from the muzzle.

Thus, the simulation device according to the present invention can be used for reproducing a dynamic munition-related environment so as to place the projectile in conditions similar to the conditions encountered during a muzzle blast when a projectile exits the muzzle. To this end, the propulsion device allows to propel the impactor at a predefined velocity towards the rear end of the projectile, which is suspended by means of the suspension device, so as to directly strike the rear end of the projectile. Since the suspended projectile is free to move along the longitudinal axis thereof, the impact of the impactor on the rear end of the projectile leads to the projectile undergoing a shock which is similar to a muzzle blast the projectile is subject to when exiting the muzzle, in such a way that a specific shock response spectrum at a projectile exit from a muzzle can be reproduced using the simulation device according to the present invention.

After the impact, the resistance, or at least the behavior, of equipment onboard the projectile can then be checked. The simulation device according to the present invention can indeed be used for generating spectra of environmental responses to muzzle blasts in the laboratory and for recovering instrumented blocks or simply the electronics or equipment onboard the projectile, for expertise purposes. The present invention thus can be used for testing and qualifying the means of protection of the blocks/equipment on board the projectile, which makes it possible to work on damping solutions in the real environment of the projectiles.

Unlike the solution existing in the space-related field, there is no need, in the present invention, to design a resonant structure for reproducing the complete system (rocket/missile), the instrumented projectile being directly excited by striking the projectile along the longitudinal axis thereof and thus generating the correct modes of vibratory response.

The projectile is freely mounted along the main stress axis (i.e. the longitudinal axis thereof). The impactor and the impact velocity are defined so as to generate the correct level of stress on the projectile. It is possible to vary the response spectra of the projectile by modifying the impact velocity of the impactor.

According to a particular feature of the invention, the impactor is metallic.

Thus, the excitation of the projectile, the body of which is also metallic, is based on a mechanical metal/metal impact between the impactor and the rear end of the projectile.

According to a particular feature of the invention, the impactor is a metal bar, one of the ends of which is configured for striking the rear end of the projectile in the suspended position thereof.

According to a particular feature of the invention, the propulsion device is a gas gun.

Thus, the gas gun (also called light-gas gun), consisting of a tank containing gas under pressure and a launch tube, accelerates the impactor at high velocity so that the impactor strikes the projectile at the predefined impact velocity. To this end, the gun tank is first filled with gas (mainly helium, nitrogen or air) under pressure, then the gas is released very quickly using a valve when the desired pressure is reached, which accelerates the impactor right to the exit of the gas gun launch tube.

According to a particular feature of the invention, the suspension device consists of one or a plurality of slings configured for suspending the projectile below a support structure.

Thereby, the sling(s) are removably attached both to the projectile and to the support structure, so as to suspend the projectile in the longitudinal direction thereof, under the support structure.

According to a particular feature of the invention, at least one sling is configured for suspending the front portion of the projectile from the support structure and at least one other sling is configured for suspending the rear portion of the projectile from the support structure.

The support structure can be any gantry or similar system for suspending slings for fastening the projectile so that the projectile is at a sufficient height with respect to the ground for moving it along the longitudinal axis thereof without touching the ground, the support structure being preferentially fixed with respect to the ground, in particular ballasted or even attached to the ground, so that the structure does not absorb the shock imparted to the projectile.

Thereby, the projectile suspended under the support structure is mounted free to move along the longitudinal axis thereof.

According to a particular feature of the invention, the simulation device further comprises a high-speed camera configured for recording the behavior of the projectile during the impact of the impactor on the projectile in the suspended position thereof.

High-speed camera means a tool used for recording images of a rapidly moving object, such as a photographic sensor (e.g. CCD (i.e. based on a charge transfer device) or CMOS (i.e. Complementary metal-oxide-semiconductor) type) recording nearly 1000 frames per second.

Thus, the high-speed camera can be used for observing the behavior of the projectile during an equivalent of muzzle blast, without being hindered by the presence of a muzzle brake or by firing gases or by a projectile recovery structure.

The present invention further relates to a simulation device-projectile assembly comprising a simulation device as described hereinabove and an instrumented projectile configured for being placed in a dynamic munition-related environment simulated by using the simulation device, the instrumented projectile comprising an accelerometer arranged either on or inside the projectile and linked to a device for computing the shock response spectrum.

The simulation device can be used for placing the instrumented projectile in an environment similar to the environment of a muzzle blast. The accelerometer placed either onto or inside the projectile can be used for detecting the acceleration of the projectile during the impact thereof by means of the impactor, and the computing device makes it possible to compute, using data coming from the accelerometer, the shock response spectrum resulting from the impact of the impactor on the rear end of the instrumented projectile.

A further object of the present invention is a method for simulating a munition-related dynamic environment for a projectile using a simulation device as described hereinabove, characterized in that the method comprises: a) suspending the projectile according to the longitudinal direction thereof by means of the suspension device so that the projectile is mounted freely along the longitudinal axis thereof; b) defining an impactor propulsion velocity for reproducing a shock response spectrum specific to an exit of a projectile from a muzzle when the projectile is excited by the impactor; c) propelling, using the propulsion device, the impactor at the defined propelling velocity towards the rear end of the projectile so as to strike the rear end of the projectile along the longitudinal axis of the projectile so as to reproduce the shock response spectrum specific to an exit of the projectile from a muzzle.

The simulation method according to the present invention can thus be used for reproducing a dynamic munition-related environment so as to place the projectile in conditions similar to the conditions encountered during a muzzle blast from the projectile.

According to a particular feature of the invention, during step c), the projectile is temperature-conditioned. Thereby, the temperature conditioning of the projectile during the impact of the projectile by means of the impactor can be used for placing the projectile in conditions as close as possible to the conditions undergone by the projectile during the exit from a muzzle, the temperature of the projectile being chosen to be similar to the temperature reached by the projectile exiting a muzzle. According to a particular feature of the invention, during step c), the high-speed camera records the behavior of the projectile upon impact of the impactor on the projectile. According to a particular feature of the invention, the projectile integrates at least one onboard electronic unit inside the projectile, and the method further comprises, after the step c): d) recovering and analyzing the at least one onboard electronic unit of the projectile.

After the impact, the resistance of the at least one electronic unit onboard the projectile is thereby checked. The means of protection of the at least one onboard electronic unit can thereby be tested and qualified, which makes it possible to subsequently work on damping solutions in the real environment of the projectiles.

According to a particular feature of the invention, the method uses a simulation device-projectile assembly as described hereinabove, characterized in that: during the step c), the accelerometer measures the acceleration of the projectile during the impact of the impactor on the projectile; and after the step c), the device for computing the shock response spectrum computes the shock response spectrum resulting from the impact.

In order to better illustrate the subject matter of the present invention, a preferred embodiment will be described hereinafter, as an illustration, but in a non-limiting way, with reference to the enclosed drawings.

Figure 2:
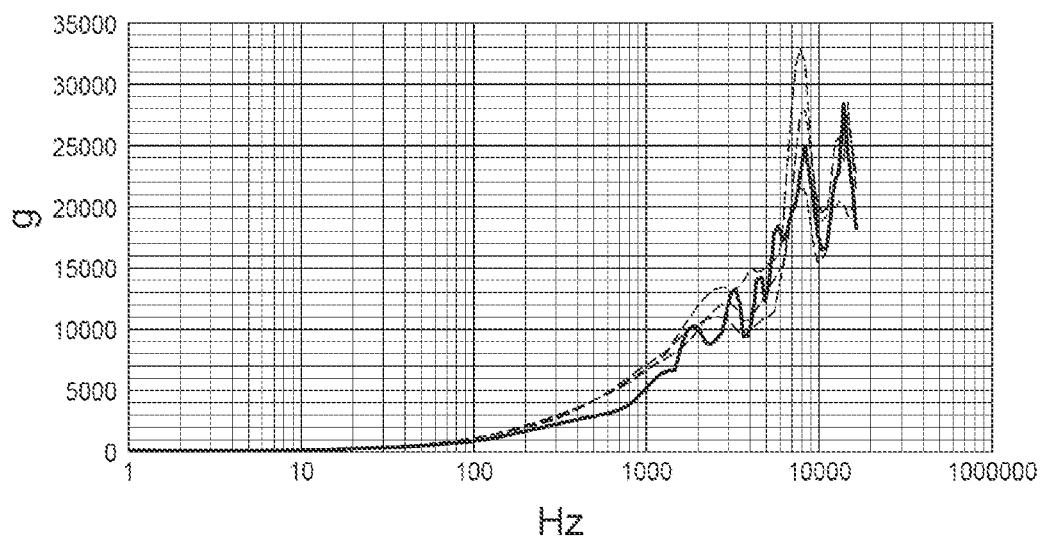

On these drawings:

FIG. 1 is a schematic perspective view of a simulation device-projectile assembly according to the present invention; and FIG. 2 represents different shock response spectra obtained using the simulation device-projectile assembly shown in FIG. 1.

Referring to FIG. 1, it can be seen that the figure shows a simulation device-projectile assembly according to the present invention, comprising a simulation device 1 and a projectile 2, the simulation device 1 being used for reproducing a dynamic munition-related environment such as a muzzle blast from the projectile 2.

The simulation device 1 comprises a suspension device 3 configured for suspending the projectile 2 along the longitudinal direction thereof so that the projectile 2 in the suspended position thereof is mounted free along the longitudinal axis thereof.

The suspension device 3 consists of a first sling 3a for suspending the front part of the projectile 2 from a support structure 4 and of a second sling 3b for suspending the rear part of the projectile 2 from the support structure 4.

It should be noted that the suspension device 3 could also consist of any number of slings, without departing from the scope of the present invention.

The gantry type support structure 4 comprises a horizontal rectangular frame 4a and four vertical uprights 4b arranged at the four corners of the frame 4a and being used for raising the latter. The support structure 4 is preferentially made fixed with respect to the ground, being in particular ballasted or directly attached to the ground. A first ring 5a is attached to the front part of the projectile 2, the first sling 3a being inserted in the first ring 5a and the two ends of the first sling 3a being attached to two opposite sides of the frame 4a, respectively.

Similarly, a second ring 5b is attached to the rear part of the projectile 2, the second sling 3b being inserted in the second ring 5b and the two ends of the second sling 3b being attached to said two opposite sides of the frame 4a, respectively.

The simulation device 1 further comprises a propulsion device 6 arranged along the longitudinal direction of the suspended projectile 2, facing the rear end 2a of the suspended projectile 2 at a predefined distance from the latter, and an impactor 7 such as a metal bar configured for being propelled by the propulsion device 6 at a predefined velocity towards the rear end 2a of the suspended projectile 2 in order to obtain a metal/metal impact between the rear end 2a of the projectile 2 and one of the ends of the metal bar impactor 7.

The propulsion device 6 is a light-gas gun, consisting of a tank 6a containing gas under pressure and a launch tube 6b, which accelerates the impactor 7 at high velocity so that the latter strikes the projectile 2 at a predefined impact velocity.

The projectile 2 is an instrumented projectile comprising an accelerometer 8 arranged on the projectile 2 and connected through a wire 10, to a computing device 9 arranged on the frame 4a of the support structure 4.

It should be noted that the accelerometer 8 could also be arranged inside the projectile 2 and connected wirelessly to the computing device 9, without departing from the scope of the present invention.

The accelerometer 8 can be used for detecting the acceleration of the projectile 2 during the impact by means of the impactor 7, and the computing device 9 can compute, using the data coming from the accelerometer 8, the shock response spectrum resulting from the impact of the impactor 7 on the rear end 2a of the projectile 2.

Thereby, the simulation device 1 can be used for reproducing a dynamic munition-related environment for placing the projectile 2 in conditions similar to the conditions encountered during a muzzle blast and is designed in such a way that the impact of the projectile 2 by means of the impactor 7 generates a shock response spectrum which is similar to the spectrum of the exit of the projectile 2 from a muzzle.

The instrumented projectile 2 incorporates, inside therein, at least one onboard electronic unit 11.

After the impact, the resistance, or at least the behavior, of the onboard electronic unit 11 can be checked. Thereby, the present invention can be used for testing and qualifying means of protection of the onboard electronic unit 11 inside the projectile 2, which then makes it possible to work on damping solutions in the real environment of the projectile 2.

The impact velocity of the impactor 7 on the projectile 2 is selected so as to generate the correct level of stress on the projectile 2 for simulating a muzzle blast. The shock response spectrum computed by the computing device 9 thus depends on the value chosen for the impact velocity, so that the modification of the impact velocity can be used for varying the computed shock response spectrum.

The simulation device 1 further comprises a high-speed camera 12 for recording the behavior of the projectile 2 during the impact of the impactor 7 on the rear end 2a of the projectile 2, which can be used for observing the behavior of the projectile 2 during an equivalent of a muzzle blast, without being hindered by the presence of a muzzle brake or by firing gases or by a projectile recovery structure.

The simulation device 1 can thus be used for implementing a method of simulating a dynamic munition-related environment for the projectile 2 comprising the following steps:

suspending the projectile 2 along the longitudinal direction thereof using the suspension device 3 so that the projectile 2 is mounted freely along the longitudinal axis thereof;

defining a propulsion velocity of the impactor 7 for reproducing a shock response spectrum specific to an exit of the projectile 2 from the muzzle when the projectile 2 is excited by the impactor 7;

optionally, temperature conditioning the projectile 2 to a temperature similar to the temperature reached at the exit from the muzzle;

propelling, using the propulsion device 6, the impactor 7 at the defined propulsion velocity towards the rear end 2a of the projectile 2;

striking, using the propelled impactor 7, the rear end 2a of the projectile 2 along the longitudinal axis of the projectile 2 so as to reproduce the shock response spectrum specific to an exit of the projectile 2 from a muzzle;

measuring, using the accelerometer 8, the acceleration of the projectile 2 during the impact of the impactor 7 on the projectile 2;

optionally, recording, using the high-speed camera 12, the behavior of the projectile 2 during the impact of the impactor 7 on the projectile 2;

computing, using the computing device 9, using the data from the accelerometer 8, the shock response spectrum resulting from the impact; and recovering and analyzing the onboard electronic unit 11 of the projectile 2.

Referring to FIG. 2, it can be seen therein, three shock response spectra (shown in dotted lines) from projectile 2, as obtained under simulated exit conditions from a muzzle, using the simulation device 1, and a shock response spectrum (represented in solid lines) from projectile 2, as obtained in a real condition of exit from a muzzle during a weapon firing.

A shock response spectrum is a graphical representation of a shock, wherein the horizontal axis represents the natural frequency (in Hz) of a hypothetical single degree of freedom system and the vertical axis shows the maximum acceleration (in units of g) that such system with a single degree of freedom would undergo as a result of the impact of the shock.

It can be seen in FIG. 2 that the shock response spectra obtained using the simulation device 1 follow the shape of the shock response spectrum obtained in the real condition of exit from the muzzle. The simulation device 1 according to the present invention can therefore be used for reproducing with great fidelity the conditions of a muzzle blast on the projectile 2.

It is understood that the particular embodiment which was just described was given as an indication, and in a non-limiting way, and that modifications can be made thereto without departing from the present invention.

The invention claimed is:

1. A simulation device of a dynamic munition-related environment for a projectile, wherein the simulation device comprises:
   a suspension device configured for suspending the projectile along the longitudinal direction of the projectile so that the projectile in the suspended position is mounted free along the longitudinal axis of the projectile projectile,
   a propulsion device configured for being arranged facing the rear end of the in the suspended position of the projectile at a predefined distance from the projectile, and
   an impactor configured for being propelled by the propulsion device, at a predetermined velocity toward the rear end of the projectile in the suspended position, so as to strike the rear end of the projectile so as to reproduce a shock response spectrum specific to an exit of the projectile from a muzzle.

2. The simulation device according to claim 1, wherein the impactor is metallic.

3. The simulation device according to claim 2, wherein the impactor is a metal bar, one of the ends of the impactor being configured for striking the rear end of the projectile in the suspended position.

4. The simulation device according to claim 1, wherein the propulsion device is a gas gun.

5. The simulation device according to claim 1, wherein the suspension device is at least one sling configured for suspending the projectile under a support structure.

6. The simulation device according to claim 5, wherein at least one sling is configured for suspending the front part of the projectile from the support structure and at least one further sling is configured for suspending the rear part of the projectile from the support structure.

7. The simulation device according to claim 1, wherein the simulation device further comprises a high-speed camera configured for recording the behavior of the projectile when the impactor impacts the projectile in the suspended position.

8. A simulation device-projectile assembly comprising a simulation device according to claim 1 and an instrumented projectile configured for being placed in a dynamic munition-related environment simulated by means of the simulation device, the instrumented projectile comprising an accelerometer arranged either on or inside the projectile and connected to a shock response spectrum computing device.

9. A method of simulating a dynamic munition-related environment for a projectile using a simulation device according to claim 1, wherein the method comprises:
   a) suspending the projectile along the longitudinal direction of the projectile using the suspension device so that the projectile is mounted freely along the longitudinal axis of the projectile,
   b) defining a propulsion velocity of the impactor for reproducing a shock response spectrum specific to exit of the projectile from the muzzle when the projectile is excited by the impactor,
   c) propelling, by means of the propulsion device, the impactor at the propulsion velocity defined towards the rear end of the projectile so as to strike the rear end of the projectile along the longitudinal axis of the projectile so as to reproduce the shock response spectrum specific to an exit of the projectile from a muzzle.

10. The method according to claim 9, wherein, during the step c), the projectile is temperature-conditioned.

11. The method according to claim 9, wherein, during the step c), the high-speed camera records the behavior of the projectile upon impact of the impactor on the projectile.

12. The method according to claim 9, wherein at least one onboard electronic unit is incorporated in the projectile, and the method further comprises, after the step c):
   d) recovering and analyzing the at least one onboard electronic unit of the projectile.

13. The method according to claim 9 using an assembly comprising a simulation device of a dynamic munition-related environment for a projectile, wherein the simulation device comprises:
   a suspension device configured for suspending the projectile along the longitudinal direction of the projectile so that the projectile in the suspended position is mounted free along the longitudinal axis of the projectile,
   a propulsion device configured for being arranged facing the rear end of the projectile in the suspended position of the projectile at a predefined distance from the projectile, and
   an impactor configured for being propelled by the propulsion device, at a predetermined velocity toward the rear end of the projectile in the suspended position, so as to strike the rear end of the projectile so as to reproduce a shock response spectrum specific to an exit of the projectile from a muzzle and an instrumented projectile configured for being placed in a dynamic munition-related environment simulated by means of the simulation device, the instrumented projectile comprising an accelerometer arranged either on or inside the projectile and connected to a shock response spectrum computing device, wherein:
   during the step c), the accelerometer measures the acceleration of the projectile during the impact of the impactor on the projectile, and
   after the step c), the shock response spectrum computing device computes the shock response spectrum resulting from the impact.

\* \* \* \* \*